US011808707B2

(12) United States Patent
Skupniewicz et al.

(10) Patent No.: US 11,808,707 B2
(45) Date of Patent: Nov. 7, 2023

(54) RAMAN MODULE FOR A MICROSCOPE

(71) Applicant: THERMO ELECTRON SCIENTIFIC INSTRUMENTS LLC, Madison, WI (US)

(72) Inventors: George L. Skupniewicz, Madison, WI (US); Francis J. Deck, Madison, WI (US)

(73) Assignee: Thermo Electron Scientific Instruments LLC, Madison, WI (US)

(*) Notice: Subject to any disclaimer, the term of this patent is extended or adjusted under 35 U.S.C. 154(b) by 98 days.

(21) Appl. No.: 16/854,213

(22) Filed: Apr. 21, 2020

(65) Prior Publication Data

US 2020/0333253 A1    Oct. 22, 2020

Related U.S. Application Data

(60) Provisional application No. 62/836,832, filed on Apr. 22, 2019.

(51) Int. Cl.
*G01N 21/65* (2006.01)
*G02B 27/10* (2006.01)
(Continued)

(52) U.S. Cl.
CPC ............. *G01N 21/65* (2013.01); *G01N 21/64* (2013.01); *G02B 21/0004* (2013.01);
(Continued)

(58) Field of Classification Search
CPC ................... G01N 21/65; G01N 21/64; G01N 2201/06113; G01N 2201/0636;
(Continued)

(56) References Cited

U.S. PATENT DOCUMENTS 5,194,912 A * 3/1993 Batchelder ........... G02B 21/004
356/301
5,377,004 A   12/1994 Owen et al.
(Continued)

FOREIGN PATENT DOCUMENTS

| CN | 105377134 A | * | 3/2016 | ........... A61B 5/0059 |
| CN | 108700460 A | * | 10/2018 | ........... G01J 3/0208 |
| CN | 112557360 A | * | 3/2021 | ........... A61B 5/0071 |

OTHER PUBLICATIONS

Witec Alpha300 series; Brochure 2018, downloaded from https://raman.oxinst.com/assets/uploads/raman/materials/WITec-alpha300-Brochure.pdf (Year: 2018).*

*Primary Examiner* — Mohamed K Amara (57) ABSTRACT

An embodiment of a module system configured to interface with a microscope is described that comprises an input optical fiber configured to provide an excitation light beam from an external light source; dynamic alignment mirrors configured to adjust the position of the beams paths of the excitation light beam on a first plane; a coupling comprising a first end configured to engage with a complementary end, wherein the excitation light reflects off a turning mirror and travels along a beam path on a second plane through an orifice in the coupling; and an output optical fiber for delivering light from a sample to an external detector, wherein the light from the sample travels along the beam path on the second plane through the orifice in the coupling, reflects off the turning mirror and travels along one of the beam paths on the first plane to the output optical fiber.

11 Claims, 4 Drawing Sheets

(51) Int. Cl.
  *G02B 26/08* (2006.01)
  *G02B 21/00* (2006.01)
  *G02B 21/18* (2006.01)
  *G02B 27/14* (2006.01)
  *G02B 21/36* (2006.01)
  *G01N 21/64* (2006.01)
  *G02B 21/16* (2006.01)

(52) U.S. Cl.
  CPC ............ *G02B 21/16* (2013.01); *G02B 21/18* (2013.01); *G02B 21/362* (2013.01); *G02B 26/0816* (2013.01); *G02B 27/1006* (2013.01); *G02B 27/141* (2013.01); *G01N 2201/0636* (2013.01); *G01N 2201/06113* (2013.01); *G01N 2201/084* (2013.01)

(58) Field of Classification Search
  CPC ..... G01N 2201/084; G01N 2021/6417; G01N 2021/6484; G01N 21/6458; G01N 2021/6423; G01N 2021/6476; G01N 2021/656; G02B 21/0004; G02B 21/16; G02B 21/18; G02B 21/362; G02B 26/0816; G02B 27/1006; G02B 27/141; G02B 21/006; G02B 6/4246; G01J 3/0218; G01J 3/0291; G01J 3/44; G01J 3/02; G01J 3/027; G01J 3/0297; G01J 3/4412

See application file for complete search history.

(56) References Cited

U.S. PATENT DOCUMENTS

| | | | |
|---|---|---|---|
| 5,841,139 A * | 11/1998 | Sostek | G01J 3/44 250/339.05 |
| 5,943,128 A * | 8/1999 | Slater | G01J 3/44 356/318 |
| 6,002,476 A * | 12/1999 | Treado | G01J 3/44 356/301 |
| 6,281,971 B1 | 8/2001 | Allen et al. | |
| 6,486,948 B1 * | 11/2002 | Zeng | G01J 3/04 356/334 |
| 6,717,668 B2 * | 4/2004 | Treado | G02B 21/365 356/326 |
| 6,870,612 B2 * | 3/2005 | Jiang | G02B 21/241 356/301 |
| 6,907,149 B2 | 6/2005 | Slater | |
| 7,102,746 B2 | 9/2006 | Zhao | |
| 7,522,797 B2 * | 4/2009 | Treado | A61B 1/043 600/177 |
| 7,595,873 B1 * | 9/2009 | Deck | G01J 3/44 356/301 |
| 7,688,440 B2 * | 3/2010 | Clarke | G01N 21/65 356/301 |
| 8,009,289 B2 | 8/2011 | Cappel | |
| 8,135,249 B2 | 3/2012 | Li et al. | |
| 8,189,975 B2 | 5/2012 | Sullivan et al. | |
| 9,891,418 B2 | 2/2018 | Spizig et al. | |
| 10,247,674 B2 * | 4/2019 | Huang | G01J 3/44 |
| 2002/0105640 A1 * | 8/2002 | Deck | G02B 21/18 356/301 |
| 2005/0128476 A1 * | 6/2005 | Zhao | G01J 3/44 356/301 |
| 2005/0185178 A1 * | 8/2005 | Gardner, Jr. | G01N 21/65 356/301 |
| 2006/0051036 A1 * | 3/2006 | Treado | A61B 1/07 385/119 |
| 2010/0134792 A1 * | 6/2010 | Roussel | G01J 3/2803 356/326 |
| 2012/0044484 A1 * | 2/2012 | Henneberg | G01N 21/64 356/213 |
| 2012/0140301 A1 * | 6/2012 | Xu | G02B 23/243 359/198.1 |
| 2012/0302862 A1 * | 11/2012 | Yun | A61B 3/1025 600/407 |
| 2013/0018237 A1 * | 1/2013 | Henneberg | A61B 5/1451 600/310 |
| 2013/0070249 A1 * | 3/2013 | Choi | G01B 9/02091 349/200 |
| 2015/0056645 A1 * | 2/2015 | Vacca | G01N 15/1459 435/29 |
| 2017/0010456 A1 * | 1/2017 | Gopinath | G02B 21/006 |
| 2017/0273564 A1 * | 9/2017 | Banke | G01J 1/4257 |
| 2020/0355554 A1 * | 11/2020 | Scarcelli | G02B 21/0096 |
| 2022/0042908 A1 * | 2/2022 | Scarcelli | G01N 21/636 |

* cited by examiner

RAMAN MODULE FOR A MICROSCOPE

CROSS-REFERENCE TO RELATED APPLICATIONS

The present application claims the priority benefit from U.S. Patent Application Ser. No. 62/836,832, filed Apr. 22, 2019, which is hereby incorporated by reference herein in its entirety for all purposes.

FIELD OF THE INVENTION

The present invention is generally directed to a module mountable to the top of a microscope and configured to deliver laser light to and collect light from a sample disposed on the microscope.

BACKGROUND

It is generally appreciated that it is desirable to combine a standard light microscope with elements that enable Raman Spectroscopy of a sample disposed on the stage of the microscope so that a user can use what is referred to a bright field imaging to locate one or more regions of interest associated with a sample and then use Raman Spectroscopy to identify characteristics such as, for example, the chemical composition of the sample at the regions of interest.

It is also generally appreciated that there is an advantage to provide low cost solutions to the combined bright field/ Raman approach with good visual performance, especially those that may utilize off the shelf light microscope embodiments already available to a user. Further, some light microscope embodiments may have other desirable options available. For example, some embodiments may offer fluorescence illumination optics as optional elements that are complementary to both bright field imaging and Raman Spectroscopy.

Therefore, there is a need for a design of a low-cost module configured to enable Raman Spectroscopy and to easily interface and function with a commercially available standard light microscope with or without its complementary options.

SUMMARY

Systems, methods, and products to address these and other needs are described herein with respect to illustrative, non-limiting, implementations. Various alternatives, modifications and equivalents are possible.

An embodiment of a module system configured to interface with a microscope is described that comprises an input optical fiber configured to provide an excitation light beam from an external light source; dynamic alignment mirrors configured to adjust the position of the beams paths of the excitation light beam on a first plane; a coupling comprising a first end configured to engage with a complementary end, wherein the excitation light reflects off a turning mirror and travels along a beam path on a second plane through an orifice in the coupling; and an output optical fiber for delivering light from a sample to an external detector, wherein the light from the sample travels along the beam path on the second plane through the orifice in the coupling, reflects off the turning mirror and travels along one of the beam paths on the first plane to the output optical fiber.

In some implementations the dynamic alignment mirrors provide control of the one or more beam paths over multiple axes, and the first plane is a substantially horizontal plane and the second plane is a substantially vertical plane.

Further, an embodiment of a microscope system is described that comprises a Raman module with an input optical fiber configured to provide an excitation light beam from an external light source and one or more beams paths of the excitation light beam, that travel on a first plane; a first coupling element comprising a first end, wherein the excitation light beam reflects off a turning mirror and travels along a beam path on a second plane through an orifice in the first end; and an output optical fiber for delivering scattered light from a sample to an external detector, wherein the scattered light from the sample travels along the beam path on the second plane through the orifice in the coupling, reflects off the turning mirror and travels along one of the beam paths on the first plane to the output optical fiber; a camera module that comprises a second coupling element with a second end configured to engage with the first end of the Raman module, wherein the excitation light beam and the scattered light from the sample travel along the beam path on the second plane through an orifice in the second end; a beam selector transmissive to a wavelength of the excitation light beam and the scattered light from the sample, and reflective to a wavelength of light different from the wavelength of the excitation light beam and the scattered light from the sample; a camera that detects the light at the wavelength of light different from the wavelength of the excitation light beam and the scattered light from the sample; a third coupling element comprising a third end, wherein the excitation light beam and the scattered light from the sample travels along a beam path on the second plane through an orifice in the third end; and a light microscope, comprising a fourth coupling element with a fourth end configured to engage with the third end of the camera module, wherein the excitation light beam and the scattered light from the sample travel along the beam path on the second plane through an orifice in the fourth end.

In some cases, the Raman module further comprises a plurality of dynamic alignment mirrors configured to adjust the position of the one or more beams paths of the excitation light beam.

Also, an embodiments of a method for changing a wavelength of laser light is described that comprises the steps of: removing a first Raman module from a microscope assembly, wherein the microscope assembly comprises the first Raman module coupled to the top of a camera module coupled to the top of a microscope, further wherein the Raman module is optically coupled to a laser comprising a first wavelength; and attaching a second Raman module to the top of the camera module of the microscope assembly, wherein the second Raman module is optically coupled to a second laser comprising a second wavelength.

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 110 appears first in FIG. 1). All of these conventions, however, are intended to be typical or illustrative, rather than limiting.

Like reference numerals refer to corresponding parts throughout the several views of the drawings.

DETAILED DESCRIPTION OF EMBODIMENTS

As will be described in greater detail below, embodiments of the described invention include a low-cost module configured to enable Raman Spectroscopy and easily interface and function with a commercially available standard light microscope and its complementary options. More specifically, the module is configured for easy removal and replacement with different embodiments that enable a wide range of excitation frequencies without affecting the configuration of the microscope optics or other elements.

Figure 1:
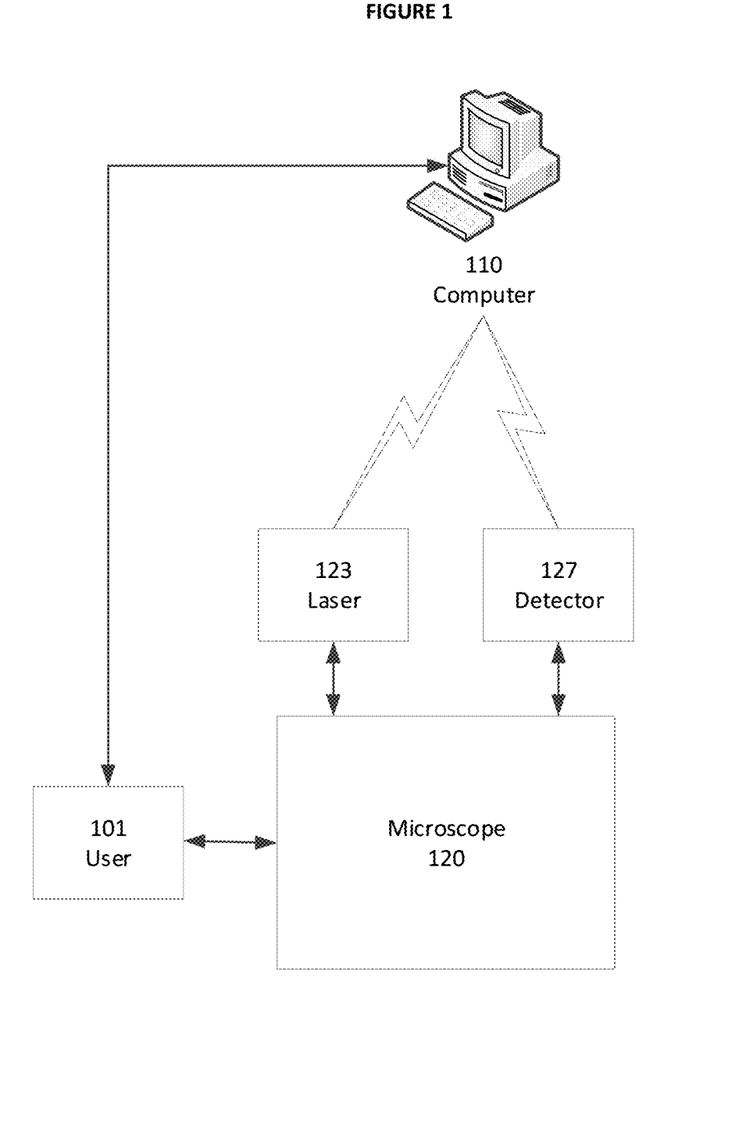
FIG. 1 is a simplified graphical representation of one embodiment of a microscope operatively coupled to a laser and a detector, wherein the laser and the detector are in communication with a computer.

FIG. 1 provides a simplified illustrative example of user 101 capable of interacting with computer 110 and microscope 120. Microscope 120 is also operatively connected to laser 123 and detector 127 each of which will be described in greater detail below. Also, as described above embodiments of microscope 120 may include a variety of commercially available light microscopes. For example, in some embodiments microscope 120 may include one or more of the BX, CX, or TX series microscopes available from Olympus Corporation.

FIG. 1 also illustrates a network connection between computer 110 and laser 123 as well as detector 127, however it will be appreciated that FIG. 1 is intended to be exemplary and additional or fewer network connections may be included. Further, the network connection between the elements may include "direct" wired or wireless data transmission (e.g. as represented by the lightning bolt) as well as "indirect" communication via other devices (e.g. switches, routers, controllers, computers, etc.) and therefore the example of FIG. 1 should not be considered as limiting.

Computer 110 may include any type of computing platform such as a workstation, a personal computer, a tablet, a "smart phone", one or more servers, compute cluster (local or remote), or any other present or future computer or cluster of computers. Computers typically include known components such as one or more processors, an operating system, system memory, memory storage devices, input-output controllers, input-output devices, and display devices. It will also be appreciated that more than one implementation of computer 110 may be used to carry out various operations in different embodiments, and thus the representation of computer 110 in FIG. 1 should not be considered as limiting.

In some embodiments, computer 110 may employ a computer program product comprising a computer usable medium having control logic (e.g. computer software program, including program code) stored therein. The control logic, when executed by a processor, causes the processor to perform some or all of the functions described herein. In other embodiments, some functions are implemented primarily in hardware using, for example, a hardware state machine. Implementation of the hardware state machine so as to perform the functions described herein will be apparent to those skilled in the relevant arts. Also in the same or other embodiments, computer 110 may employ an internet client that may include specialized software applications enabled to access remote information via a network. A network may include one or more of the many types of networks well known to those of ordinary skill in the art. For example, a network may include a local or wide area network that may employ what is commonly referred to as a TCP/IP protocol suite to communicate. A network may include a worldwide system of interconnected computer networks that is commonly referred to as the internet, or could also include various intranet architectures. Those of ordinary skill in the related art will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

As described herein, embodiments of the described invention include a low-cost Raman module configured to enable Raman Spectroscopy and to easily interface and function with a commercially available standard light microscope. Importantly, the light microscope may also include one or more optional modules that may provide some complementary function to Raman Spectroscopy, and thus embodiments of the Raman module are configured to interface and function with the light microscope alone or with one or more of the optional modules. In some embodiments the optional modules are available from the manufacturer of the light microscope, however in some embodiments optional modules may also be available via third party suppliers or manufacturers. Further, the Raman module is configured for easy installation and removal. Also, multiple embodiments of the Raman module may be used, each having optical elements and/or characteristics tuned to a different laser wavelength that enable use of a wide range of excitation frequencies without affecting the configuration of the optics or other elements of microscope 120 or the optional modules. For example, a first Raman module may include one or more optical elements such as filters that are optimized for use with a first laser at a particular wavelength. In the present example, it may be desirable to interrogate a sample with a different wavelength from that provided by the first laser. Therefore, a second Raman module may be interchanged with the first Raman module. The second Raman module may include one or more optical elements optimized for use with a second laser at a second wavelength different from the first wavelength.

As described herein there are numerous advantages provided by the invention. First, users can utilize standard illumination optics provided with a commercially available microscope as well as optional Fluorescence illumination optics or other desirable options. Further, fiber optic coupling enables flexible positioning of laser 123 and detector 127 that enables compact system footprints and ability to minimize thermal or vibrational disturbances. For example, detector 127 can be mounted far away from microscope 120 which enables the use of a thermo-electrically cooled scientific camera which resides in separate environment from microscope 120. This can provide significant performance advantages over detectors that are mounted on, or positioned in close proximity to, microscope 120.

Figure 2:
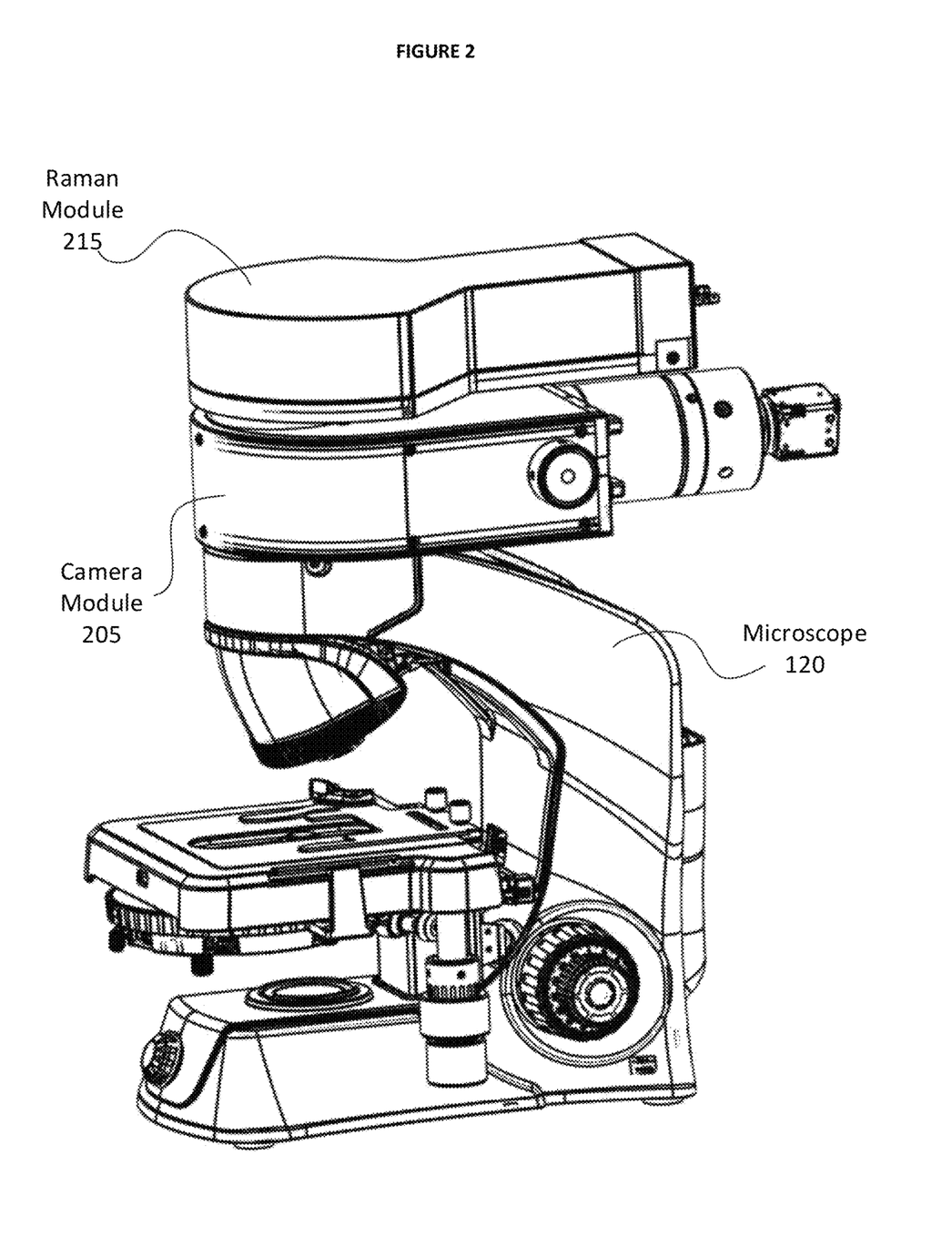
FIG. 2 is a simplified graphical representation of one embodiment of the microscope of FIG. 1 coupled to a camera module and a Raman module.

It will also be appreciated that fiber optic coupling provides a number of other advantages such as, substantially lossless energy transmission, a diffraction-limited point light source for the highest confocality and spatial resolution, long-term stability, and user-friendliness so that need for further adjustment is minimal. Last, in the embodiments described herein polarization direction of the light is maintained for the most intricate polarization-dependent measurements FIG. 2 provides an illustrative example of an embodiment of microscope 120 operatively coupled to camera module 205 and Raman module 215. It will be appreciated that camera module 205 and Raman module 215 are configured in a stacked arrangement with Raman module 215 on the top of the arrangement. In the embodiments described herein camera module 205 is optional and Raman module 215 is also configured to coupled directly to the top of microscope 120. Further, as described above, there could be additional or alternative modules between Raman module 215 and microscope 120. For example, because Raman module 215 is positioned above microscope 120 and any intervening modules it can be easily removed without altering the configuration of any intervening module, such as camera module 205, or the configuration of microscope 120. In the presently described example, this is useful because there would be no requirement to perform any optical alignment of elements associated with any intervening module or microscope 120 after interchanging embodiments of Raman module 215.

Figure 3:
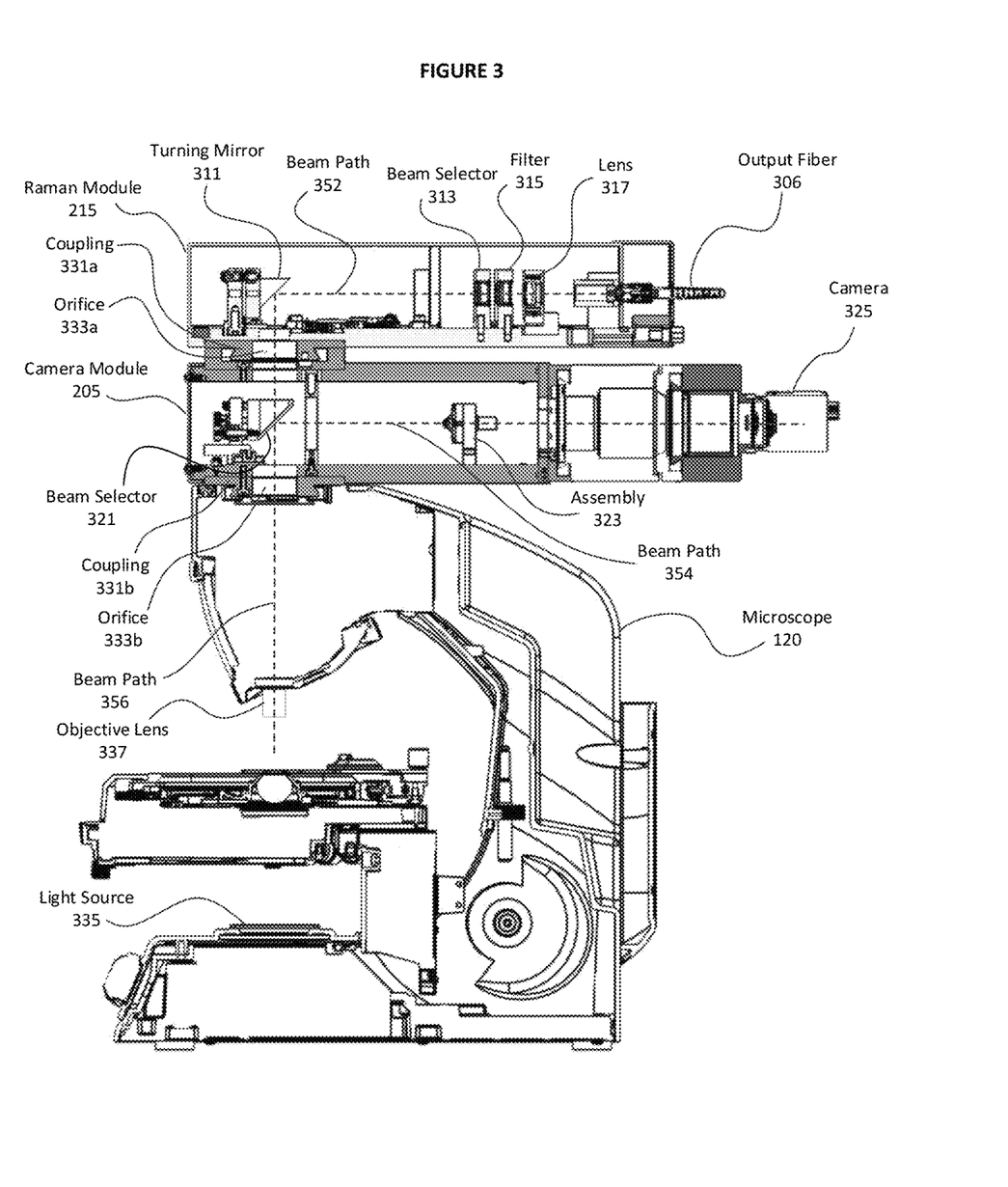
FIG. 3 is a simplified graphical representation of one embodiment of a cutaway view of the microscope, the camera module, and the Raman module of FIG. 2.

FIG. 3 provides an illustrative example of a cut away view from the side of microscope 120, camera module 205, and Raman module 215. As described above, embodiments of microscope 120 include elements commonly found in commercially available light microscopes such as light source 335, and one or more objective lenses 337. For example, light source 335 may include any type of light source available with a standard light microscope. In the present example, light source 335 may be typically used for transmitting light through a sample that is collected by objective lens 337.

Also illustrated in FIG. 3 are elements that may be found in optional camera module 205. For example, camera module 205 may include camera 325 configured to detect wavelengths of interest such as those used in bright field (e.g. the visible spectrum), Near Infra-Red (NIR), and/or fluorescence microscopy. Some embodiments may also include assembly 323 that may include a lens, or other optical element, as well as a source of illuminating light that includes a broadband source such as an incandescent bulb, LED source, or other source of broadband light (e.g. white light) known in the art. Further, in the presently described example assembly 323 may be offset from a direct optical path to camera 325, where one or more optical elements may be used to steer the beam appropriately.

In the embodiments described herein, camera module 205 also includes beam selector 321 which typically includes a dichroic mirror, or other type of beam selection element known in the art that is transmissive at a first wavelength or range of wavelengths and reflective at a second wavelength or range of wavelengths. For example, an embodiment of Raman module 215 may be associated with a laser that provides a beam comprising a wavelength of about 455 nm, about 532 nm, about 633 nm, about 785 nm, about 1064 nm, or other wavelength usable for Raman spectroscopy. The laser beam from Raman module 215 travels along beam path 356 through beam selector 321 (e.g. that is transmissive at 532 nm) and focused by objective lens 337 to a sample. Raman scattered light from the sample comprises a wavelength that is also about 532 nm and returns along beam path 356, through beam selector 321, to Raman module 215. In the presently described example, beam selector 321 may be transmissive at about 532 nm and reflective at other wavelengths and the returning Raman scattered light is reflected by turning mirror 311 and travels along beam path 352 to lens 317 that focuses the light on to an end of output fiber 306. In the embodiments described herein, output fiber 306 comprises an optical fiber that is coupled to detector 127 that may include an embodiment of a spectrograph or other detector element known in the art. It will be noted that FIG. 3 also illustrates beam selector 313 and filter 315, which will be described in greater detail below.

Also continuing the example from above, light from light source 335 and/or assembly 323 may provide a different wavelength of light from the laser and the Raman scattered light from the sample. In some embodiments the wavelength provided by may be outside of a high end of the visible spectrum (e.g. 390 to 700 nm), such as a wavelength of about 784 nm (e.g. in the Near Infra-Red (NIR) spectrum). Embodiments of beam selector 321 may be reflective at 784 nm and thus light at 784 nm traveling along beam path 356 or beam path 354 are reflected by beam selector 321 (e.g. directed to the sample or to camera 325).

FIG. 3 also illustrates coupling 331a and 331b which operatively couple modules 205/215, and microscope 120 together. In the embodiments described herein, coupling 331a and 331b comprise the same coupling design that, for instance, easily engages and disengages allowing rapid interchangeability by a user without the requirement of tools. In some embodiments, the coupling may comprise what is referred to as a "dovetail" configuration that is commonly employed with embodiments of microscope 120. For example, the coupling design may comprise a male end and a female end configured to engage with the male end. In some embodiments Raman module 215 is configured to be the top position of the stack arrangement with the first end configuration of coupling 331a positioned on the bottom of Raman module 215 that engages with the second end configuration of another module or microscope 120. In such an embodiment there is no coupling element on the top of Raman module 215, however in some embodiments Raman module 215 may not be configured to be the top position and/or multiple embodiments of Raman module 215 may be used in the stacked arrangement. In such embodiments, Raman module 215 includes a second end configuration on the top side that can engage with other modules or components.

Optional modules, such as camera module 205, typically comprise a second end configuration at the top of the module (e.g. to engage with another module such as Raman module 215) as well as a first end configuration at the bottom of the module (e.g. to engage with another module or microscope 120). Also, couplings 331a and 331b include orifice 333a and 333b (e.g. positioned in the center of both end configuration elements of the coupling) that allows passage of beam path 356 that travels in a substantially vertical orientation relative to microscope 120 (e.g. beam path 356 optically couples Raman module 215 with the sample). However, in some embodiments the stacked arrangement of microscope 120 with camera module 205 and Raman module 215 could be oriented 90 degrees from the illustration of FIG. 3 such that beam path 356 travels in a substantially horizontal direction relative to the position of microscope 120.

It will be appreciated that in some embodiments the first configuration is the same for both first end and the third end, and the second configuration is the same for both second end and the fourth end. However, in some embodiments the coupling with the first and second end elements may have a different configuration from the coupling with the third and fourth end elements. It will also be appreciated that in some embodiments the first configuration may include a male end and the second configuration may include a female end, however the opposite is also included within the scope of the described invention and thus the example of FIG. 3 should not be interpreted as limiting.

Figure 4:
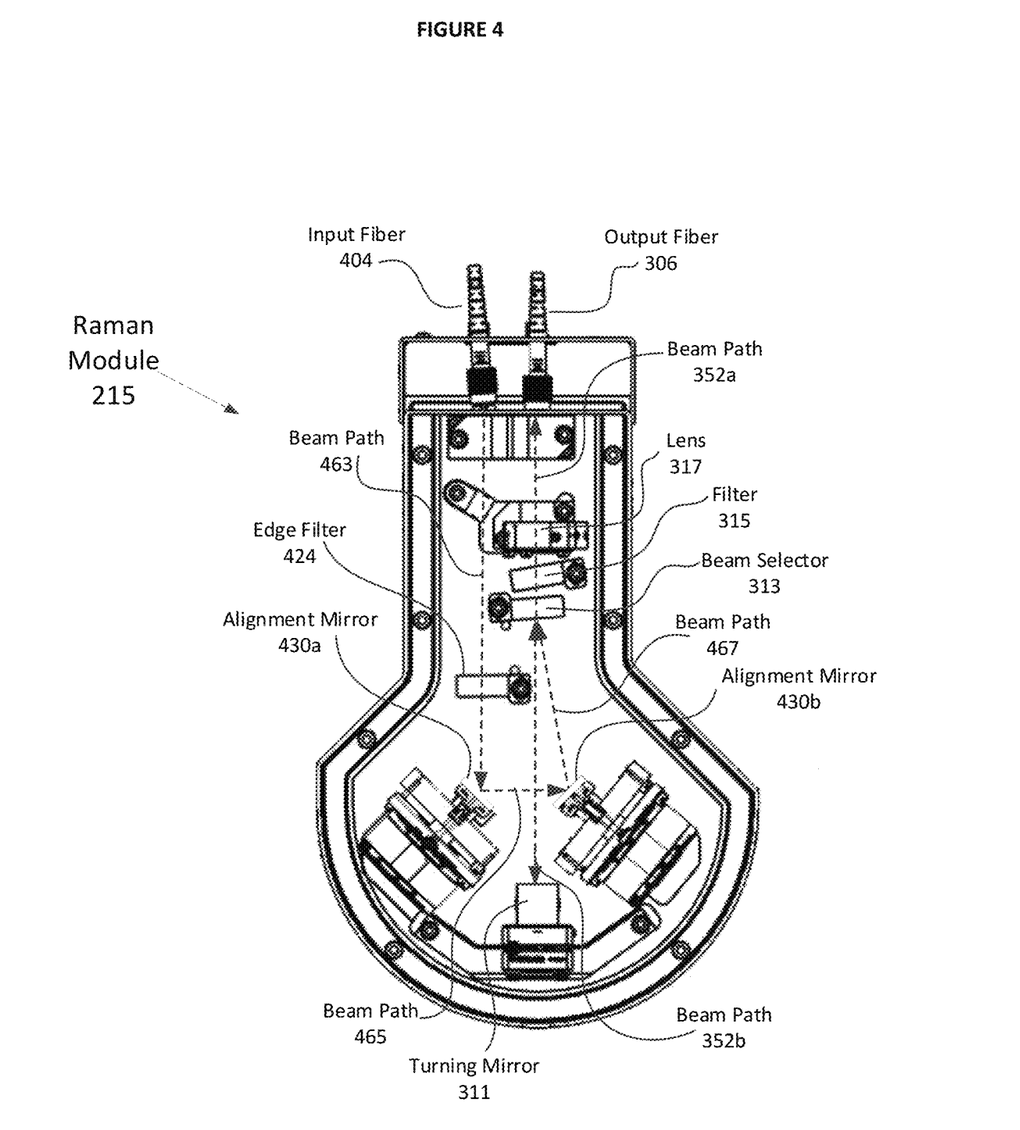
FIG. 4 is a simplified graphical representation of one embodiment of a cutaway view of the Raman module of FIGS. 2 and 3.

FIG. 4 provides an illustrative example of a cut away view from the top of laser module 215 that includes input fiber 404 that comprises an optical fiber coupled to laser 123 that may include an embodiment of a laser tuned to a specific wavelength, a wavelength tunable laser, or other type of laser known in the art. In the described embodiments, it is generally desirable that the wavelength of laser 123 is matched to the configuration of optical elements of Raman module 215, such as one or more filters. For example, laser 123 may produce a beam that enters Raman module 215 via input fiber 404 and travels along beam path 463 through edge filter 424 (e.g. that is transmissive at the wavelength of the laser beam) to alignment mirror 430a. The laser beam is reflected off alignment mirror 430a and travels along beam path 465 to alignment mirror 430b, that reflects the laser beam along beam path 467 to beam selector 313 (e.g. may include an edge filter). In the presently described example, beam selector 313 is reflective at the wavelength of the laser beam and thus the laser beams travels towards turning mirror 311 that reflects the laser beam into an optional module (e.g. downward into camera module 205) and/or into microscope 120.

It will be appreciated that some optical alignment may be necessary after installation of an embodiment of Raman module 215 onto an optional module or onto microscope 120 so that the laser beam travels along the correct path optically coupling Raman module 215 to the sample. In the embodiments described herein adjustment to beam paths 465, 467, and 352b is accomplished using alignment mirrors 430a and 430b. For example, alignment mirrors 430a and 430b may each be mounted on a bearing with an axis of rotation nearly perpendicular to the surface of the mirror so that rotation of alignment mirrors 430a and 430b on the bearings through a small angle provides a controllable amount of tilt. In the presently described example, the change in tilt of alignment mirrors 430a and 430b provides dynamic control of beam paths 465, 467, and 352b over multiple axes. Additional examples of alignment mirrors and process of alignment are described in U.S. patent application Ser. No. 16/234,656, titled "MIRROR ALIGNMENT IN OPTICAL SCIENTIFIC INTRUMENTS", which is hereby incorporated by reference herein in its entirety for all purposes.

In the embodiments described herein, beam paths 463, 465, 467, 352a, and 352b are positioned in a substantially horizontal orientation relative to the position of microscope 120. However, as described above in some embodiments the stacked arrangement of microscope 120 with camera module 205 and Raman module 215 could be oriented 90 degrees from the illustration of FIG. 3 such that beam paths 463, 465, 467, 352a, and 352b are positioned in a substantially vertical orientation relative to the position of microscope 120.

Raman scattered light returning to Raman module 215 from an optional module (e.g. camera module 205) and/or microscope 120 is reflected by turning mirror 311 and travels along beam path 352b to beam selector 313 which is transmissive at the wavelength of the Raman scattered light. After transmission through beam selector 313 the Raman scattered light passes through filter 315 (e.g. a bandpass filter) that removes extraneous wavelengths of light that are outside of a range of interest and then is focused by lens 317 onto the opening of output fiber 306 (e.g. to transmit the light to detector 127 as described above).

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiments

What is claimed is:

1. A module system configured to interface with a microscope, comprising, as a unitary Raman module:
    an input optical fiber configured to provide an excitation light beam from an external light source;
    a plurality of dynamic alignment mirrors, optically coupled with the input optical fiber, being configured to adjust the position of one or more beam paths of the excitation light beam, wherein the one or more beam paths are on a first plane;
    a first coupling element comprising a first end configured to engage with a complementary end of a second coupling element on the microscope, thereby positioning the module system at a top of the microscope;
    a turning mirror, optically coupled with the input optical fiber via the plurality of dynamic alignment mirrors the turning mirror being configured to reflect substantially all of the excitation light beam from a first beam path of the one or more beam paths on the first plane to a second beam path on a second plane through an orifice in the first and second coupling elements, wherein the first coupling element is configured to allow the module system to be selectively attached and detached from the microscope without altering the configuration of the microscope or any components of the microscope; and
    an output optical fiber, optically coupled with a sample via the turning mirror and configured to receive light from the sample through the orifice, wherein the turning mirror is further configured to reflect substantially all of the light from the sample from the second beam path on the second plane to a third beam path of the one or more beam paths on the first plane.

2. The module system of claim 1, further comprising:
    one or more optical elements positioned ahead of the output optical fiber on one of the beam paths on the first plane, wherein the one or more optical elements are configured to condition the spectroscopic signal.

3. The module system of claim 1, wherein:
    the external detector comprises a spectrograph.

4. The module system of claim 1, wherein:
the excitation light beam comprises a laser light beam.

5. The module system of claim 1, wherein:
the excitation light beam comprises a 455 nm wavelength, a 532 nm wavelength, a 633 nm wavelength, a 785 nm wavelength, or a 1064 nm wavelength.

6. The module system of claim 1, wherein:
the external light source comprises a laser.

7. The module system of claim 1, wherein:
the coupling is configured to engage and disengage without the requirement of tools.

8. The module system of claim 1, wherein:
the coupling comprises a dovetail configuration.

9. The module system of claim 1, wherein:
the dynamic alignment mirrors provide control of the one or more beam paths over multiple axes.

10. The module system of claim 1, wherein:
the first plane is a substantially horizontal plane and the second plane is a substantially vertical plane.

11. The module system of claim 1, wherein:
the beam path on the second plane travels through a beam selector in a second module, wherein the beam selector is transmissive to a wavelength of the excitation light beam and the light from the sample.

* * * * *